(12) United States Patent  (10) Patent No.: US 6,687,754 B1
Sorensen  (45) Date of Patent: Feb. 3, 2004

(54) METHOD OF DETECTING A DEVICE IN A NETWORK

(75) Inventor: Lauge Schwartz Sorensen, Hillerod (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/384,687

(22) Filed: Aug. 27, 1999

Related U.S. Application Data

(60) Provisional application No. 60/098,078, filed on Aug. 27, 1998.

(51) Int. Cl.$^7$ .............................................. G06F 15/16
(52) U.S. Cl. ...................... 709/236; 709/222; 709/223; 709/228; 709/230; 709/236; 709/243; 710/8; 710/10; 710/62; 710/220; 710/221; 345/335; 345/339; 380/10; 380/20; 380/49
(58) Field of Search ................................. 709/231, 230, 709/201, 106, 108, 220, 243, 204, 236; 395/200.06, 200.11; 345/335, 339; 380/20, 10, 49; 710/8, 10, 62, 220, 221

(56) References Cited

U.S. PATENT DOCUMENTS

| | | | | |
|---|---|---|---|---|
| 4,335,426 A | * | 6/1982 | Maxwell et al. | |
| 4,644,468 A | * | 2/1987 | Doster et al. | |
| 4,862,496 A | * | 8/1989 | Kelly et al. | |
| 4,882,749 A | * | 11/1989 | Zuk | |
| 5,099,235 A | * | 3/1992 | Crookshanks | |
| 5,181,017 A | * | 1/1993 | Frey, Jr. et al. | |
| 5,223,968 A | * | 6/1993 | Stringer et al. | |
| 5,412,724 A | * | 5/1995 | Mary | |
| 5,535,336 A | * | 7/1996 | Smith et al. | |
| 5,600,796 A | * | 2/1997 | Okamura et al. | |
| 5,668,949 A | * | 9/1997 | Nardone et al. | |
| 5,675,736 A | * | 10/1997 | Brady et al. | |
| 5,859,837 A | * | 1/1999 | Crayford | |
| 5,907,491 A | * | 5/1999 | Canada et al. | |
| 5,913,037 A | * | 6/1999 | Spofford et al. | |
| 5,999,712 A | * | 12/1999 | Moiin et al. | |
| 6,008,805 A | * | 12/1999 | Land et al. | |
| 6,014,669 A | * | 1/2000 | Slaughter et al. | |
| 6,058,427 A | * | 5/2000 | Viswanath et al. | |
| 6,098,103 A | * | 8/2000 | Dreyer et al. | |
| 6,098,116 A | * | 8/2000 | Nixon et al. | |
| 6,108,699 A | * | 8/2000 | Moiin | |
| 6,122,639 A | * | 9/2000 | Babu et al. | |
| 6,185,605 B1 | * | 2/2001 | Kowaguchi | |
| 6,272,640 B1 | * | 8/2001 | Sokol | |
| 6,389,479 B1 | * | 5/2002 | Boucher et al. | |

* cited by examiner

*Primary Examiner*—Hosain Alam
*Assistant Examiner*—Young N Won
(74) *Attorney, Agent, or Firm*—Fish & Richardson P.C.

(57) ABSTRACT

A method is disclosed for permitting devices connected to a network to identify characteristics of other devices connected to a network. The devices may automatically obtain information about the other devices in the network in a distributed manner without required a centralized management entity. This means that functions, such as device configuration, can be performed without a system administrator. This reduces the risk of system failure at the system administrator by reducing the reliance on the administrator. The disclosed method may be used in a network employing Ethernet or token-ring frame formats.

17 Claims, 2 Drawing Sheets

METHOD OF DETECTING A DEVICE IN A NETWORK

CROSS-REFERENCE TO RELATED APPLICATIONS

This application claims the priority of U.S. Provisional Patent Application No. 60/098,078, filed Aug. 27, 1998.

BACKGROUND OF THE INVENTION

The present invention relates generally to networks, and more particularly, to a method for detecting devices connected to such a network.

Networks, such as computerized Local Area Networks (LANs) are commonly used to interconnect many different devices, such as computers. There is an increasing requirement to provide communication between these devices. This is because of the number of devices that are to be connected together, and the increases in the amount of information that is to be communicated between them. As a result, a number of networking technologies have been developed, and many standards have been developed around these technologies.

One example of such a technology includes a token ring network in which many devices are connected in either a physical or logical ring, and a token is transmitted around the ring from device to device. When a device requires access to the ring to transmit information, it waits to receive the token and then holds the token while transmitting data on the network. Other devices are prevented from receiving the token while information is being transmitted by the token holder.

Another networking technology is Ethernet. Ethernet is a commonly used LAN scheme in which multiple devices are connected together. In some cases, only one device can transmit data at a time. A device transmits data in the form of a packet that includes a destination address. The packet propagates throughout the network, and is received by all other devices connected to the network. The destination device may copy the entire packet. The other devices may reject the packet after determining that it is addressed to the destination device.

Because of the large number of users and devices associated with a LAN, management of the LAN is quite complex and can be handled by a system administrator or a centralized management system. The system administrator or central management system is an entity that a user of a device typically contacts when the user encounters a problem related to the network. The increasing growth and complexity of LANs makes it more difficult for a user to contact the system administrator. For example, the identity and/or location of the system administrator may not be known to many users. In addition, reliance on these centralized management systems can cause congestion in the LAN due to the number of packets destined to the system administrator. Further, a centralized management system increases the risk of network failure because of the excessive reliance on the system administrator.

SUMMARY OF THE INVENTION

In general, in one aspect, the present invention is directed to a method for detecting characteristics of a plurality of peer devices connected to a network that includes generating. an identification frame by one of the peer devices. The identification frame may be propagated to only the other peer devices in the network.

Implementations of the invention include one or more of the following. The identification frame may include a network address or a group address. An error or a predefined MAC address may be introduced into the frame to cause the peer device to recognize the frame. The network may be a token ring or an Ethernet network. The error may be a corruption of the cyclic redundancy control (CRC) check bit or a predefined combination of the padding bits of the identification frame.

In another aspect, the present invention is directed to a computer network that includes a plurality of peer devices connected to the network by a plurality of links and switches. An identification frame is propagated from one peer device to the other peer devices to enable a plurality of features of the peer devices receiving the identification frame.

Implementations of the invention may include one or more of the following. The identification frame may be a MAC frame. The identification frame may be exchanged in a management information format. Each of the switches may have a media access controller connected between the selected device and a transceiver circuit. The transceiver circuit may include a controller for recognizing an error or a predefined MAC address in the identification frame.

In yet another aspect, the present invention is directed to a network including a plurality of peer devices that includes a plurality of switches connected to the devices. The switches may include computer software residing on a computer readable medium at each switch to recognize an identification frame from one of the peer devices. The switch may propagate the identification frame only to other ones of the peer devices in the network.

Other advantages will become apparent from the following description including the drawings and the claims.

DESCRIPTION OF THE PREFERRED EMBODIMENTS

A system administrator is responsible for managing a network. The system administrator's responsibilities may include configuring a device that is added to the network. Thus, the system administrator is responsible for the central management of the network. This means that the system administrator must enable certain functionalities of the devices, the network, and other attached peripherals. This requirement of centralized management of the system by the administrator increases the risk in a network that a network failure may occur at the system administrator. As a result, the entire network may be inoperable during the time that the network failure is being remedied. Further, a network failure at the system administrator may also cause other network failures throughout the network that initiate at the system administrator. For example, the system administrator is responsible for detecting the presence of a failed link and notifying the devices of the failure. However, if the administrator is unable to notify the devices, the devices may not receive important data. This means that the device may not be able to execute or continue a process running on its system.

Accordingly, the present inventor has discovered a method in which a device connected to a network may obtain characteristic information about other similarly connected devices without notifying or relying on the system administrator. In the preferred method, the characteristic of information is distributed using an identification frame that is propagated to various devices connected to the network to cause these devices to perform various functions.

Figure 1:
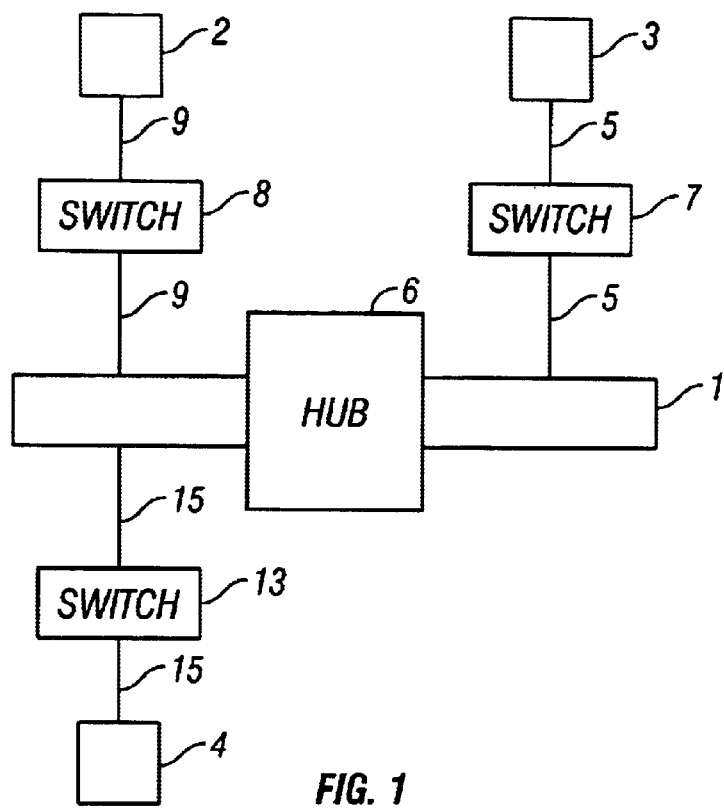
FIG. 1 is a block diagram of an exemplary network.

FIG. 1 illustrates an example network, such as a local area network (LAN) 1. The network 1 may be an Ethernet medium that has a bus-type architecture. Alternatively, the network 1 may be a token-ring medium having a ring-type architecture. The network 1 may be a heterogeneous system including several connected devices, such as computers or peripherals, to which the devices can share access. Alternatively, the network may be a homogeneous network in which every connected device uses the same protocol.

FIG. 1 shows that a device 2 is connected to the network 1 by a switch 8 via links 9. Similarly, a device 3 is connected to the network 1 by a switch 7 via links 5, and a device 4 is connected to the network 1 by a switch 13 via links 15. Each of the switches 7, 8, and 13 may include ports (not shown) for propagating data to or from an attached device. Each of the switches 7, 8, and 13 may include multiple ports for connecting multiple devices to the network 1. A switch is a network device that operates at a data link layer of the Open Systems Interconnection (OSI) reference model. The switches 7, 8, and 13 may be bridges, routers, or other similar devices for propagating frames of data throughout the network 1. The devices 2, 3, and 4 may include a personal computer (PC), a file server, a printer, or other suitable devices that may interface with the network 1. A system administrator 25 may also be connected to the network 1. The network 1 may also include a hub 6 that can be used to connect the devices 2, 3, and 4 of network 1 to other networks including other devices. For example, network 1 may be connected to an Ethernet or token ring network.

Figure 2:
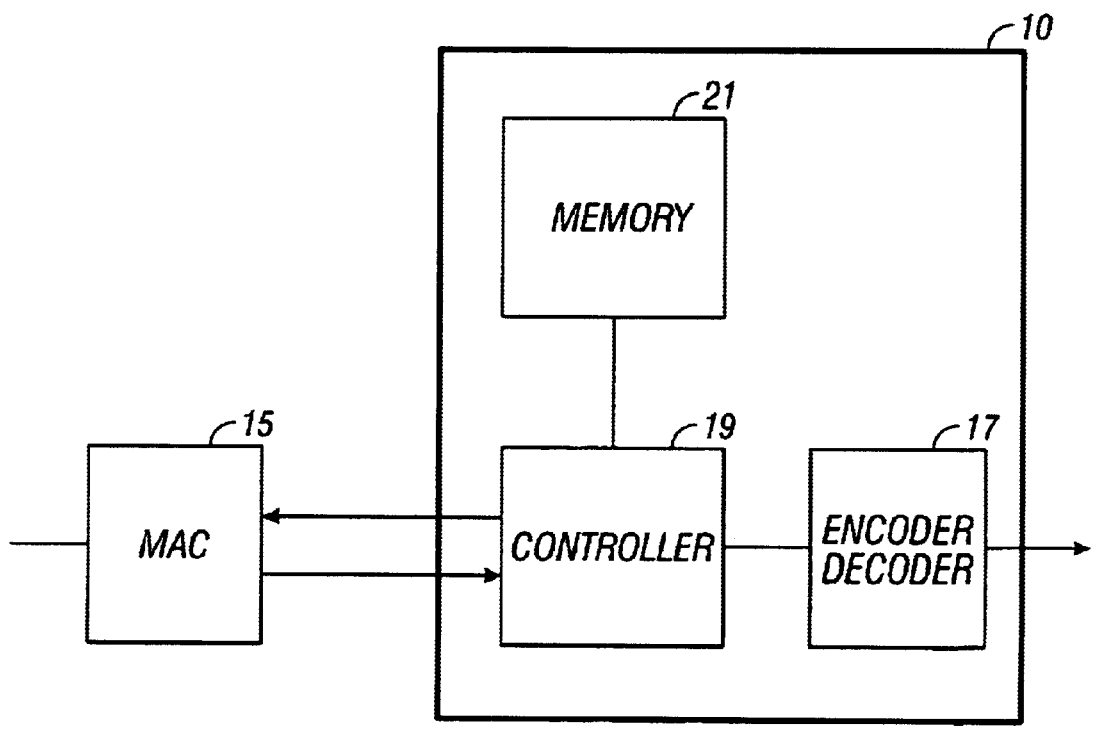
FIG. 2 illustrates a block diagram of a switch that can be implemented in the network of FIG. 1.

FIG. 2 illustrates an example block diagram of a suitable configuration for the switches, 7, 8, and 13. The switch includes a transceiver circuit 10 connected to a media access control (MAC) 15. The MAC 15 is an interface between a physical layer device, such as a transceiver circuit 10, and the attached device. The MAC 15 generally may perform a plurality of functions. For example, during the transmission of data, the MAC assembles the data to be transmitted into a frame of data with address and error detection fields. Conversely, during the reception of the frame of data, the MAC disassembles the frame and performs address checking and error detection. Further, the MAC may perform preamble generation/removal.

The switches 7, 8, and 13 may also have different configurations to support different topologies or protocols. Further, each of the switches 7, 8, and 13 may be configured to perform different functions. For example, the controller may be programmed to cause only switch 7 to process frames of data received from a device located on a specific link of the network 1.

The transceiver circuit 10 includes an encoder/decoder circuit 17, a controller 19, and 20 a memory 21 connected to the controller 19. The transceiver circuit 10 is a physical layer device that takes data from the MAC 15, encodes it, and serializes it for transmission on one of the attached links. This process is reversed for data propagating towards the attached device. The controller 19 may perform a variety of functions including an auto-negotiation process. An auto-negotiation process may be stored in the memory 21. The controller may execute the auto-negotiation process between the switch and the attached device. An example of an auto-negotiation process is set forth in Clause 28 of the IEEE 802.3 Standard. The auto-negotiation process exchanges information about each device, determines the common capabilities of the device, and selects the highest performance common capabilities between the switch and the device.

As discussed above, in the preferred method, an identification frame is transmitted between devices in the network to enable certain functionalities of the devices. Preferably, the identification frame is only transmitted to "peer" devices in the network. A peer device is a device that can be configured to process or identify the identification frame from other frames in the network. The device may be configured explicitly. This means that a process, such as software residing on a computer, can identify the identification frame. Alternatively, the switch connected to the device can be configured to recognize the identification frame. In this configuration, a frame arriving at the switch that is recognized as an identification frame that is to be passed to an attached device will be propagated to that device. If the switch does not recognize the frame, the frame is not processed.

Preferably, the identification frame may include characteristic information about the sending device. For example, the identification frame 40 may include information to determine whether a peer device is from a specific group, such as a particular corporation. Further, the identification frame can include the network address of the sending device or information about other peer devices. This identification information may be exchanged in the form of sysObjectId object in the management information base (MIB) MIB-II MIB format.

The identification frame may also include information that can be used to enable certain functionalities of the device that sends or receives the identification frame. For example, information between devices may be obtained to determine the specifications about a device such as the processor speed of a device. The preferred method may be used to control adaptive packet sizes by enabling large frame or jumbo frames in an Ethernet. The preferred method may also be used to provide secured data transmissions between peer devices. For example, a device can transmit a password in the identification frame associated with particular data to a peer device that can be used to access the data.

Figure 3:
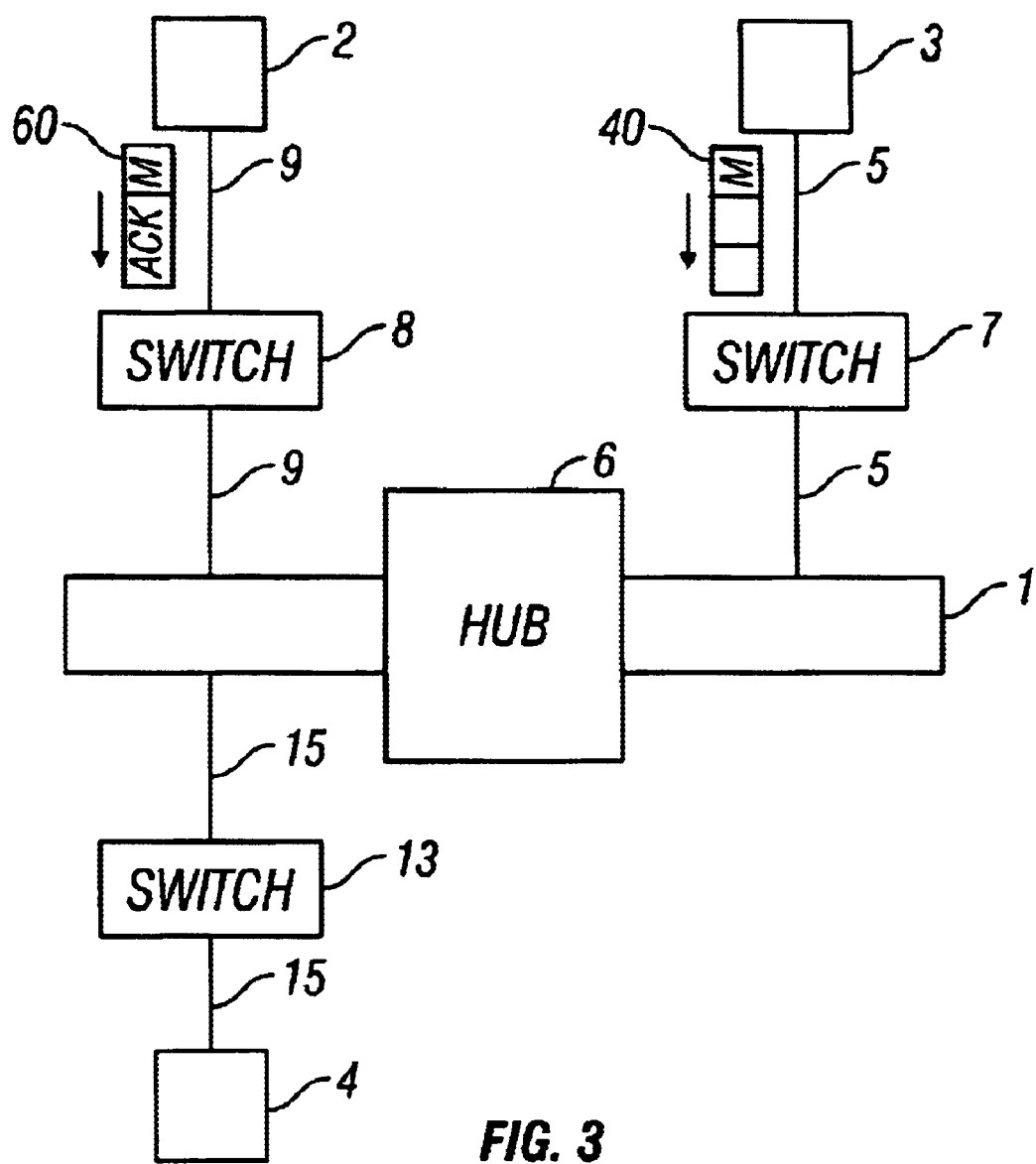
FIG. 3 illustrates an identification frame transmitted among a plurality of devices connected to the network of FIG. 1.

An example of transmitting identification frames in accordance with the preferred method is shown in FIG. 3. Assume that the identification frame 40 is configured with a predefined MAC address "M", switch.8 is configured to identify the MAC address, and the frame 40 is transmitted from the device 3. The frame may also include other information, such as source and destination address information. The frame 40 is then received at switch 7. At this stage, the identification frame 40 may be passed to the other switches 8 and 13. The frame is received and processed by switch 8 because the switch is configured to recognize that the identification frame. As a result, the frame 40 will be passed to device 2.

Conversely, the switch 13 in this example is not configured to recognize the predefined MAC address M. Accordingly, the switch will discard the frame 40. This means that device 4 is identified as a non-peer device, and thus, does not receive the identification frame 40.

In one operating regime, the identification frame can be inhibited from forwarding to non-peer devices by introducing an error in the identification frame to cause the non-peer devices or the switches connected to those devices to reject the frame. For example, the controller 19 of MAC 15 can be configured to recognize the error to identify the identification frame. The error may be a corruption of the cyclic redundancy control check (CRC) or a predefined combination of the padding bites. Padding bites may include any unused or additional bites of the identification frame.

In another operating regime, the identification frame may be inhibited from forwarding to non-peer devices using a modified MAC address. For example, the controller 19 may be configured to cause the MAC 15 to identify the identification frames. This means that a peer device can be configured to process the frame when the MAC address is identified by the MAC 15. This means that non-peer devices that are not configured to recognize the MAC address will drop the frame or forward it to an unknown address.

FIG. 3 also illustrates that the device 2 returns an identification frame 60 to device 3 that includes similar characteristic information found in identification frame 40. The identification frame 60 can also be used to transmit information to device 3. Additionally, identification frame 60 can include an "Ack" field to acknowledge that the connection between the devices 2 and 3 has been properly established. The identification frame 60 can be processed by the peer devices or the switches connected to the peer devices substantially the same as the identification frame 40.

The preferred method allows devices to communicate independent of a system administrator in a network, such as a LAN. This limits the reliance by the devices on the system administrator. For example, a device can be added or deleted from a device. When this occurs, the device can send an identification frame to notify other peer devices. This means that the system administrator does not have to take responsibility for this information. Further, the preferred method reduces the risk of system failure at the system administrator because large amount of data can be transmitted between devices. As a result, the responsibilities on the system administrator are substantially reduced.

Further, this means that such a system failure may not cause a system-wide failure throughout the network. Further, the devices can enable specific functions of attached peer devices.

The methods and mechanisms described here are not limited to any particular hardware or software configuration, or to any particular communications modality, but rather they may find applicability in any communications or computer network environment.

The techniques described here may be implemented in hardware or software, or a combination of the two. Preferably, the techniques are implemented in computer programs executing one or more programmable computers that each includes a processor, a storage medium readable by the processor (including volatile and non-volatile memory and/or storage elements), and suitable input and output devices. The programmable computers may be either general-purpose computers or special-purpose, embedded systems. In either case, program code is applied to data entered with or received from an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk, magnetic diskette, or memory chip) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

A number of embodiments of the present invention have been described. Nevertheless, it will be understood that various modifications may be made without departing from the spirit and scope of the invention. Accordingly, other embodiments are within the scope of the following claims. For example, the identification frame may include characteristic information to cause the peer devices to make optimal use of bandwidth in the network.

What is claimed is:

1. A method for identifying and enabling communication capabilities of peer devices connected to a network, the method comprising:

generating a first identification frame at a first peer device in a network when the first peer device is coupled with the network, the first identification frame indicating that the first peer device belongs to a group of devices and has a communication feature common to the group of devices, the common communication feature governing how devices communicate with each other in the network, said generating including inhibiting the first identification frame from propagating to non-peer devices connected to the network;

receiving at the first peer device a second identification frame generated at a second peer device in response to receipt of the first identification frame, the second identification frame indicating that the second peer device has the common communication feature;

enabling the common communication feature based on at least one of the first and second identification frames, without relying on a centralized management device;

wherein inhibiting the first identification frame from propagating to non-peer devices comprises introducing an error into the first identification frame;

identifying the first identification frame at the second peer device by processing the error in the frame; and rejecting the first identification frame at a third device due to the error in the frame.

2. The method of claim 1, wherein the error comprises a corruption of a cyclic redundancy control (CRC) check bit of the first identification frame.

3. The method of claim 1, wherein the error comprises a predefined combination of padding bites of the first identification frame.

4. The method of claim 1, wherein the second identification frame includes information to indicate acknowledgement of receipt of the first identification frame.

5. The method of claim 1, wherein the second identification frame comprises information about other peer devices.

6. The method of claim 1, wherein the second identification frame comprises a sysObjectId object in a management information base (MIB) format.

7. The method of claim 1, wherein the network comprises an Ethernet, and enabling the common communication feature comprises controlling adaptive packet sizes.

8. The method of claim 1, wherein enabling the common communication feature comprises providing secured data transmissions among peer devices.

9. A system comprising:

a network;

a plurality of peer devices coupled with the network such that, when a new peer device is coupled with the network, an identification frame is propagated from the new peer device to the plurality of peer devices, enabling a communication feature common to the peer devices, while inhibiting propagation of the identification frame to a non-peer device coupled with the network, the common communication feature governing how devices communicate with each other in the network, and said enabling occurring without reliance on a centralized management device; and switches coupled between the network and the peer devices and the non-peer device, wherein a subset of the switches fail to recognize the identification frame as an identification frame, said frame recognition failure resulting in the identification frame not being propagated to the non-peer device, and wherein inhibiting the propagation of the identification frame to a non-peer device comprises introducing an error into the identification frame, and a second subset of the switches processes the error to identify the identification frame.

10. The system of claim 9, wherein the network comprises an Ethernet.

11. The system of claim 9, wherein the error comprises a corruption of a cyclic redundancy control (CRC) check bit of the identification frame.

12. The system of claim 9, wherein the peer devices exchange identification information in a plurality of identification frames, while inhibiting propagation of the identification frames to the non-peer device, to control adaptive packet sizes.

13. The system of claim 9, wherein the peer devices exchange identification information in a plurality of identification frames, while inhibiting propagation of the identification frames to the non-peer device, to provide secured data transmissions among the peer devices.

14. The system of claim 9, wherein the peer devices exchange identification information in management information base format in a plurality of identification frames, while inhibiting propagation of the identification frames to the non-peer device.

15. A machine-readable medium embodying information indicative of instructions to cause a device connected to a network to perform operations comprising:

generating a first identification frame at a first peer device in a network when the first peer device is coupled with the network, the first identification frame indicating that the first peer device belongs to a group of devices and has a communication feature common to the group of devices, the common communication feature governing how devices communicate with each other in the network, said generating including inhibiting the first identification frame from propagating to non-peer devices connected to the network;

receiving at the first peer device a second identification frame generated at a second peer device in response to receipt of the first identification frame, the second identification frame indicating that the second peer device has the common communication feature;

enabling the common communication feature based on at least one of the first and second identification frames without relying on a centralized management device;

wherein inhibiting the first identification frame from propagating to non-peer devices comprises introducing an error into the first identification frame;

identifying the first identification frame at the second seer device by processing the error in the frame; and rejecting the first identification frame at a third device due to the error in the frame.

16. The machine-readable medium of claim 15, wherein enabling the common communication feature comprises controlling adaptive packet sizes.

17. The machine-readable medium of claim 15, enabling the common communication feature comprises providing secured data transmissions among peer devices.

* * * * *